United States Patent
Moss et al.

(10) Patent No.: US 10,211,976 B2
(45) Date of Patent: Feb. 19, 2019

(54) HASH AUTHENTICATED DATA

(71) Applicant: SEAGATE TECHNOLOGY LLC, Cupertino, CA (US)

(72) Inventors: Robert W. Moss, Windsor, CO (US); Stacey Secatch, Longmont, CO (US); Dana L. Simonson, Owatonna, MN (US); Kristofer C. Conklin, Burnsville, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 49 days.

(21) Appl. No.: 15/212,087

(22) Filed: Jul. 15, 2016

(65) Prior Publication Data
US 2018/0019876 A1    Jan. 18, 2018

(51) Int. Cl.
G06F 12/14 (2006.01)
H04L 9/06 (2006.01)
G06F 3/06 (2006.01)
G06F 21/64 (2013.01)
H04L 9/08 (2006.01)
H04L 9/32 (2006.01)

(52) U.S. Cl.
CPC ............ *H04L 9/0643* (2013.01); *G06F 3/064* (2013.01); *G06F 3/0619* (2013.01); *G06F 3/0661* (2013.01); *G06F 3/0673* (2013.01); *G06F 21/64* (2013.01); *H04L 9/0894* (2013.01); *H04L 9/3236* (2013.01); *G06F 2221/2139* (2013.01)

(58) Field of Classification Search
CPC ......... G06F 21/50; G06F 21/64; G06F 21/565
USPC .......................................................... 713/193
See application file for complete search history.

(56) References Cited

U.S. PATENT DOCUMENTS

| | | | |
|---|---|---|---|
| 7,523,319 B2 | 4/2009 | Challener et al. | |
| 7,937,593 B2 | 5/2011 | Chen et al. | |
| 9,686,078 B1* | 6/2017 | Marr | H04L 9/3236 |
| 2002/0095579 A1* | 7/2002 | Yoshiura | G06F 21/10 713/176 |
| 2004/0005051 A1* | 1/2004 | Wheeler | H04L 9/3231 380/28 |
| 2005/0182939 A1* | 8/2005 | Yoshiura | G06F 21/10 713/176 |
| 2009/0013196 A1* | 1/2009 | Ito | H04L 9/3236 713/193 |
| 2010/0287397 A1* | 11/2010 | Naor | G06F 1/3203 713/324 |

(Continued)

OTHER PUBLICATIONS

Cui et al, A Highly Parallel Reuse Distance Analysis Algorithm on GPUs, 2012, IEEE, pp. 1080-1092.*

(Continued)

*Primary Examiner* — Luu T Pham
*Assistant Examiner* — Jenise E Jackson
(74) *Attorney, Agent, or Firm* — Holland & Hart LLP

(57) ABSTRACT

Systems and methods for hash authenticated data are described. In one embodiment, the storage device includes a storage drive and/or a controller. In some embodiments, the controller is configured to identify data to be authenticated, compute a first hash of the data using a hash function, detect a trigger event associated with the storage drive, and authenticate, after the trigger event, the data based at least in part on the first hash of the data.

9 Claims, 7 Drawing Sheets

(56) References Cited

U.S. PATENT DOCUMENTS

| | | | |
|---|---|---|---|
| 2012/0079288 A1* | 3/2012 | Hars | G06F 21/00 |
| | | | 713/193 |
| 2012/0110343 A1 | 5/2012 | Bandic et al. | |
| 2016/0026783 A1* | 1/2016 | Buer | G06F 21/34 |
| | | | 711/103 |
| 2016/0036789 A1* | 2/2016 | Hars | G06F 21/00 |
| | | | 713/171 |
| 2016/0070934 A1* | 3/2016 | Frank | G06F 21/572 |
| | | | 711/103 |
| 2017/0123703 A1* | 5/2017 | Akers | G06F 3/0625 |
| 2017/0177867 A1* | 6/2017 | Crofton | G06F 21/565 |

OTHER PUBLICATIONS

Tereshkin, Evil Maid Goes after PGP Whole Disk Encryption, Sep. 7, 2012, p. 20.*

* cited by examiner

HASH AUTHENTICATED DATA

SUMMARY

The present disclosure is directed to methods and systems for hash authenticated data. In some embodiments, the present systems and methods may authenticate data based on one or more computed hashes of the data.

A storage device for hash authenticated data is described. In one embodiment, the storage device may include a storage drive and/or a controller. In some embodiments, the controller may be configured to identify data to be authenticated, compute a first hash of the data using a hash function, detect a trigger event associated with the storage drive, and authenticate, after the trigger event, the data based at least in part on the first hash of the data.

In some cases, the trigger event may include a storage drive entering a low power mode, the storage drive existing a low power mode, a loss of power to the storage drive, the storage drive recovering from a loss of power, a scheduled event, lapsing of a predetermined time period, execution of a predetermined process by at least one of a host of the storage drive and the storage drive, an execution time of a process satisfying a predetermined process time threshold, or any combination thereof. In some cases, the hash function may include a cryptographic hash function.

In some embodiments, the controller may be configured to compute, after the trigger event, a second hash of the data using the hash function. In some cases, the controller may compare the first hash to the second hash. Upon determining the first hash matches the second hash, the controller may mark the data as being authenticated and enable the storage drive to perform an operation in relation to the data. Upon determining the first hash does not match the second hash, the controller may invalidate the data and generate a notification indicating the data failed authentication.

In some embodiments, the controller may store the first and/or second hashes in a storage drive memory. In some embodiments, the controller may be configured to encrypt the first hash and store the encrypted first hash in a storage drive memory. In some cases, the storage drive memory may be separate from a primary storage medium of the storage drive.

In some embodiments, the controller may be configured to compute a periodic hash for firmware of the storage drive, a mapping table of the storage drive, at least a portion of content stored in the storage drive memory, or any combination thereof. In some cases, the periodic hash may be computed repetitively at a predetermined interval.

An apparatus for hash authenticated data is also described. In one embodiment, the apparatus may include a processor, memory in electronic communication with the processor, and instructions stored in the memory, the instructions being executable by the processor to perform the acts of identifying data to be authenticated, generating a first hash of the data using a hash function, detecting a trigger event associated with the storage drive, computing, after the trigger event, a second hash of the data using the hash function, and, after the trigger event, authenticating the data based at least in part on the first hash and second hash of the data.

A method for hash authenticated data is also described. In one embodiment, the method may include identifying data to be authenticated, generating a first hash of the data using a hash function, detecting a trigger event associated with the storage drive, computing, after the trigger event, a second hash of the data using the hash function, and, after the trigger event, authenticating the data based at least in part on the first hash and second hash of the data.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
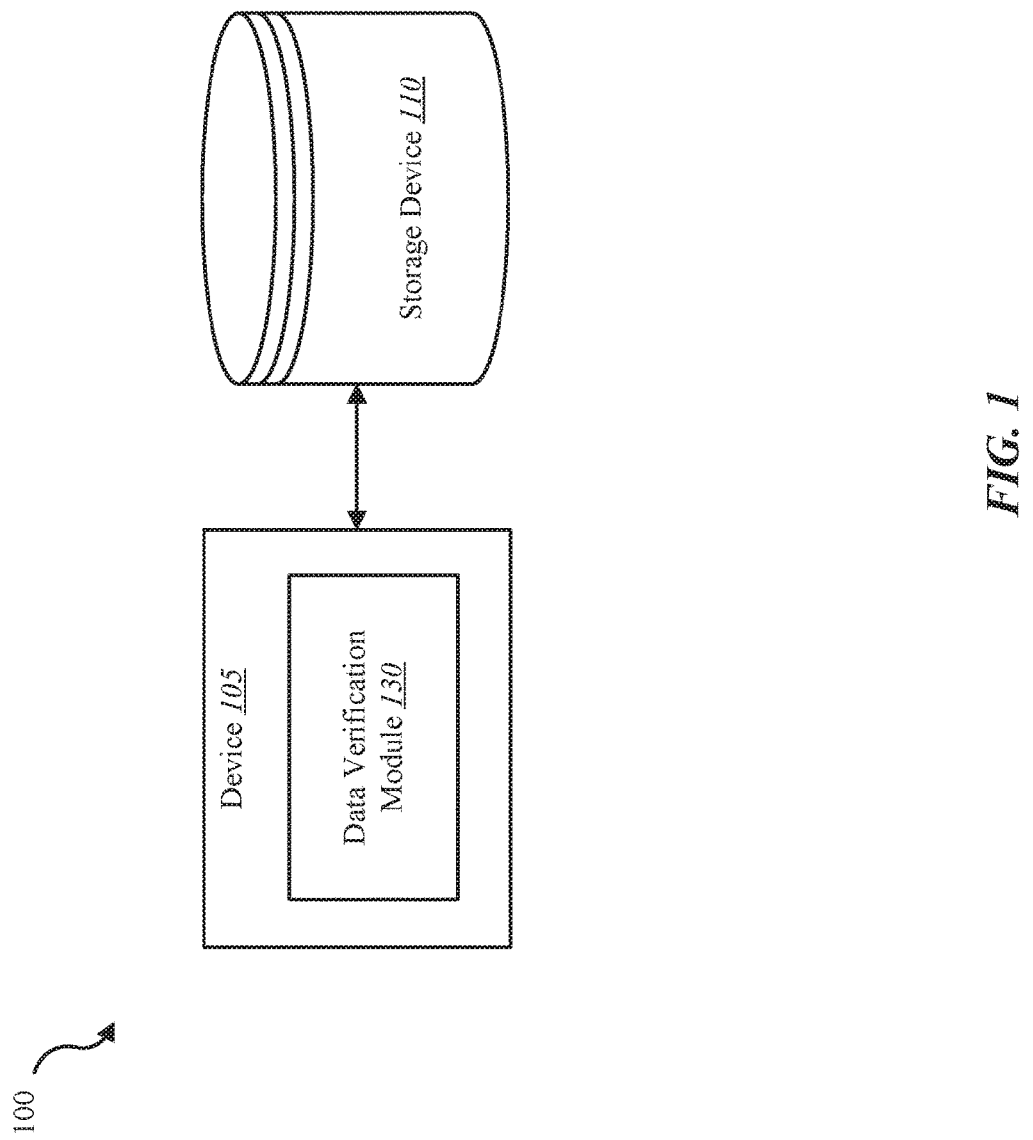
FIG. 1 is a block diagram of an example of a system in accordance with various embodiments.

The following relates generally to hash authenticated data. In one embodiment, the systems and methods include computing one or more hashes for a select set of data and verifying that the data remain uncompromised based on analysis performed in relation to the one or more hashes. The select set of data may be compromised by any number of events including hardware failure, firmware bugs, software bugs, malware infections, etc.

Memory devices associated with storage drives allow for system data, metadata, data structure and executable code to remain persistent across power cycle events and low power device states. The advantages of storing such data in a memory device include enabling a storage system to resume executing without performing a complete restore after one of these power-related events. As deeper low-power modes of operation are pursued, memory devices will be increasingly relied upon to enable rapid recovery.

Currently, a storage drive may be configured to protect data at rest, or data that is stored in permanent storage such as on a disk of a hard disk drive or in flash memory of a solid state drive, for example. However, a current storage drive does not protect data that is in flight or in motion, such as firmware and/or any data or code involved in a current operation of the storage drive. Currently, the state of the storage drive may be saved in a storage drive memory. The storage drive memory may include non-volatile memory and/or volatile memory of a storage drive such as memory inside a system on chip (SOC) of the storage drive, memory inside a field programmable gate array of the storage drive, memory of an application specific integrated circuit (ASIC) of the storage drive, memory on a circuit board of the storage drive, memory on a host machine associated with the storage drive such as main memory and/or processor cache memory, or any combination thereof.

Resuming operation of a storage drive from a low-power or no-power state may include the storage drive resuming wherever a user left off. In some cases, a storage drive may save a current state of the storage drive and/or one or more operations involving the storage drive upon entering a low-power and/or no-power state. However, currently there is no way for a storage drive to determine whether the saved state of the storage drive has been altered after resuming from the low or no power state. For example, a storage drive may be infected with malware. The malware may alter the data from the current state that is saved to a non-volatile memory on the storage drive and/or from a host of the storage drive. The malware may be configured to modify data structures on the storage drive such as forwarding tables or mapping tables, modify firmware, perform a firmware rollback, or any combination thereof.

Additionally, or alternatively, in some cases a malfunction of the storage drive and/or a host of the storage drive may cause the data from the current state to be altered. Such modifications to the data of the current state may cause further corruption to the data of the current state, data stored in permanent storage on the storage drive, code or firmware of the storage drive, code or application software of a host of the storage drive, cause physical damage to one or more components of the storage drive, or any combination thereof. Accordingly, the present systems and methods prevent malware and/or system malfunctions from altering data of a current state of a storage drive and enable the storage drive to confirm that data from the current state has not been altered or modified since it was saved to a non-volatile memory of the storage drive and/or host of the storage drive.

Errors may occur based on malware and/or system failures that result in a change to contents in storage drive memory. These changes may occur in relation to the storage drive entering a no/low power state or while the storage drive is executing an operation. For example, after the storage drive initiates execution of a process or operation and before the storage drive finishes executing the process or operation, a change may occur to data in the storage drive memory. Accordingly, the systems and methods of the present disclosure may periodically generate a hash of at least a portion of the storage drive memory. For example, the systems and methods may generate a hash of at least a portion of the storage system memory based on a predetermined time period such as once every fraction of a second, second, minute, hour, day, week, month, or any combination thereof. Additionally, or alternatively, the systems and methods may generate a hash of at least a portion of the storage system memory based on a triggering operation such as performing a hash every write operation, read operation, system maintenance operation, firmware update operation, or any combination thereof.

In one embodiment, the current state remains stored in the storage drive memory while the storage drive enters a low or no power state. In one embodiment, the storage drive detects the loss of power to itself and, in this instance, the storage drive may ensure that the data to be authenticated is stored in a non-volatile memory. For example, the storage drive may include a non-volatile memory such as a NOR or NAND flash memory device attached to a volatile memory such as a dynamic random access memory (DRAM) or static RAM (SRAM). Upon detecting the loss of power, the storage drive may transfer the contents of the volatile memory to non-volatile memory. For instance, upon detecting the loss of power, the storage drive may transfer the contents of a DRAM to a NOR or NAND flash memory. Upon recovery, the contents of the NOR flash may be transferred or copied back to DRAM. Thus, when the storage drive resumes operation from the no/low power state, the current state is retrieved from a non-volatile storage drive memory, transferred to a volatile storage drive memory, and the storage drive resumes operation where it left off before entering the no/low power state.

In one embodiment, the present systems and methods provide data security across power reduction and/or power loss events. In some embodiments, the present systems and methods enable data security at predetermined intervals across long execution times. In one embodiment, the present systems and methods may input a current state of the storage drive into a mathematical function to generate an output unique to the current state. For example, in some embodiments, the present systems and methods may implement a hash function to generate a hash value using data from the current state of the storage drive as input to the hash function. At least a portion of the data from the current state of the storage drive may be selected as an input to the hash function and the hash function may generate a hash value unique to this input. A hash function may include any mathematical function used to map data of any size (input) to data of a fixed size (output). In some cases, the input data may be referred to as the message. The output, or the value returned by a hash function, may be referred to as a hash value, hash code, hash sum, message digest, the digest, or simply the hash. In some embodiments, a hash function of the present systems and methods may be based on the advanced encryption standard (AES), message digest (MD) algorithm, secure hash algorithm (SHA), or any combination of these and other encryption standards and/or hash algorithms.

In some embodiments, data may be stored in a storage drive memory. Examples of storage drive memory may include any combination of non-volatile and/or volatile memory devices. For example, storage drive memory may include NAND flash, NOR flash, battery backed up RAM, DRAM, SRAM, magnetic RAM (MRAM), 3D cross point memory, or any combination thereof. In one embodiment, the storage drive memory may be memory separate from main memory of a host of the storage drive. Alternatively, at least a portion of the storage drive memory may include main memory from a host of the storage drive.

The storage drive memory may store the data while other components of the storage drive are put into a low power mode or no power mode. The storage drive memory may include firmware for the storage drive, firmware variable sets, any number of tables such as forward tables, mapping tables, etc., user data, system data, metadata, or any combination thereof. In some embodiments, an authentication hash may be computed over at least a selected region of the storage drive memory and/or at least a portion of the data stored in the storage drive memory. The portion of data may be selected based on a configuration that includes verifying this data remains un-modified in relation to a no/low power event. When execution resumes at a later time, the hash may be recomputed and compared to the prior hash value to ensure that the contents remain authentic across that power event. In some embodiments, verifying the authenticity of data may be orthogonal and separate from any error correcting code (ECC) techniques that may be applied to the contents of the storage drive memory.

In one embodiment, the storage drive may hash the entire contents of the storage drive memory and then after resuming from a no/low power state, perform another hash of the entire storage drive memory to determine whether any modification has occurred to the data on the storage drive memory since entering the no/low power state. As stated above, in some embodiments, in addition to authenticating the contents of a storage drive memory in relation to a power reduction or power loss event, the present systems and methods may periodically hash at least a portion of the contents of a storage drive memory as a periodic background process to ensure authenticity. Thus, in some embodiments, the storage drive may compute a hash according to a periodic interval. As one example, the storage drive may compute a hash of storage drive memory every second. Thus, if in one example the storage drive loses power and does not perform a hash upon detecting the loss of power, the storage drive may compute a hash of the storage drive memory upon resuming operation after the loss of power and compare this hash to the most recent periodically competed hash to determine whether the contents of storage drive memory were modified since the most recent periodically competed hash was computed.

In some cases, a computed hash may be stored in a non-volatile storage drive memory. For example, the present systems and methods may compute one or more hashes of contents from a first and/or second storage drive memories. In some cases, the present systems and methods may store the one or more computed hashes in the first and/or second storage drive memories. Thus, in some cases, the computed hash may be stored in the same storage drive memory that stores the contents hashed by the computed hash. Additionally, or alternatively, a computed hash may be stored on the main memory of the storage drive host, such as the main memory of a computer system that includes the storage drive. In some cases, a computed hash may be stored on a storage medium of the storage drive. In some cases, the computed hash may be stored remotely on a remote computer system and/or in cloud storage.

In some configurations, a computed hash may be periodically deleted. For example, upon resuming from a low/no power event and verifying the contents of a storage drive memory are authentic based on a comparison of the hashes of the contents computed before and after the low/no power event, the before and after hashes may be deleted. In some cases, a periodic hash may be deleted periodically. For example, a first periodic hash may be computed at a first period, followed by a second periodic hash at a second period after the first period, followed by a third periodic hash at a third period after the second period, and so forth. In some cases, the second periodic hash may replace the first periodic hash, the third periodic hash may replace the second periodic hash, and so on. Accordingly, in some embodiments, the first periodic hash may be deleted upon computing the second periodic hash, the second periodic hash may be deleted upon computing the third periodic hash, and so forth. Alternatively, in some cases, two or more periodic hashes may be retained based on a predetermined threshold. For example, the oldest periodic hash may be deleted when a number of computed periodic hashes satisfies the predetermined threshold. As one example, up to three periodic hashes may be retained at any given time. According to this example, the first, second, and third periodic hashes may be computed and each retained until a fourth periodic hash is computed. Upon computing the fourth periodic hash at a fourth period after the third period, the present systems and methods may delete the oldest periodic hash, or the first periodic hash in this case.

In one embodiment, the present systems and methods may implement a cryptographic hash function to verify the contents of a current state of a storage drive. A cryptographic hash function is a mathematical algorithm that maps data of arbitrary size to a bit string of a fixed size. A cryptographic hash function may be designed to take a string of any length as input and produce a fixed-length hash value. The cryptographic hash function may be designed to be a one-way function, a function which is infeasible to invert. For instance, the only way to recreate the input data from an ideal cryptographic hash function's output is to try every possible input until one of the inputs produces a match with the original fixed-length hash value output. The fixed-length hash value of a cryptographic hash function may only be created by performing a hash on the identical string. Any slight variation of the string results in a different output. Thus, a cryptographic hash function allows one to verify that some input data maps to a given hash value, but if the input data is unknown, it is deliberately difficult to reconstruct it (or equivalent alternatives) by knowing the stored hash value. A cryptographic hash function may include properties such as a hash value for any given message is generated within a relatively short time, it is infeasible to generate a message from a hash value except by trying all possible messages, a slight change to an input message changes the hash value to the extent the new hash value of the changed input appears uncorrelated with the hash value of the original input, and it is infeasible to find two different messages with the same hash value.

In some cases, a computed hash may be encrypted and then stored on the storage drive and/or a host of the storage drive. In some embodiments, an encryption key may be programmed into a controller of a storage drive. In one embodiment, the present systems and methods may use an encryption key on the controller of the storage drive to encrypt the computed hash. In some embodiments, the present systems and methods may decrypt the encrypted hash and compare it to another computed hash to verify the authenticity of certain data. In some configurations, one or more root keys may be associated with the storage drive. In one embodiment, the root keys may be stored on the storage drive. In some cases, the root keys may be associated with a host of the storage drive. In one embodiment, the present systems and methods may use a root key to encrypt a computed hash and store the encrypted hash on the storage drive and/or another storage location as described above.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device such as device 105. In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a data verification module 130. In one example, the device 105 may be coupled to storage device 110. In some embodiments, device 105 and storage device 110 may be components of flash memory or solid state drive. Alternatively, device 105 may be a component of a host of the storage device 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage device 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Data verification module 130 may be configured to compute one or more hashes of data from storage device 110 and determine the data remains uncompromised based on analysis of the one or more computed hashes.

Figure 2:
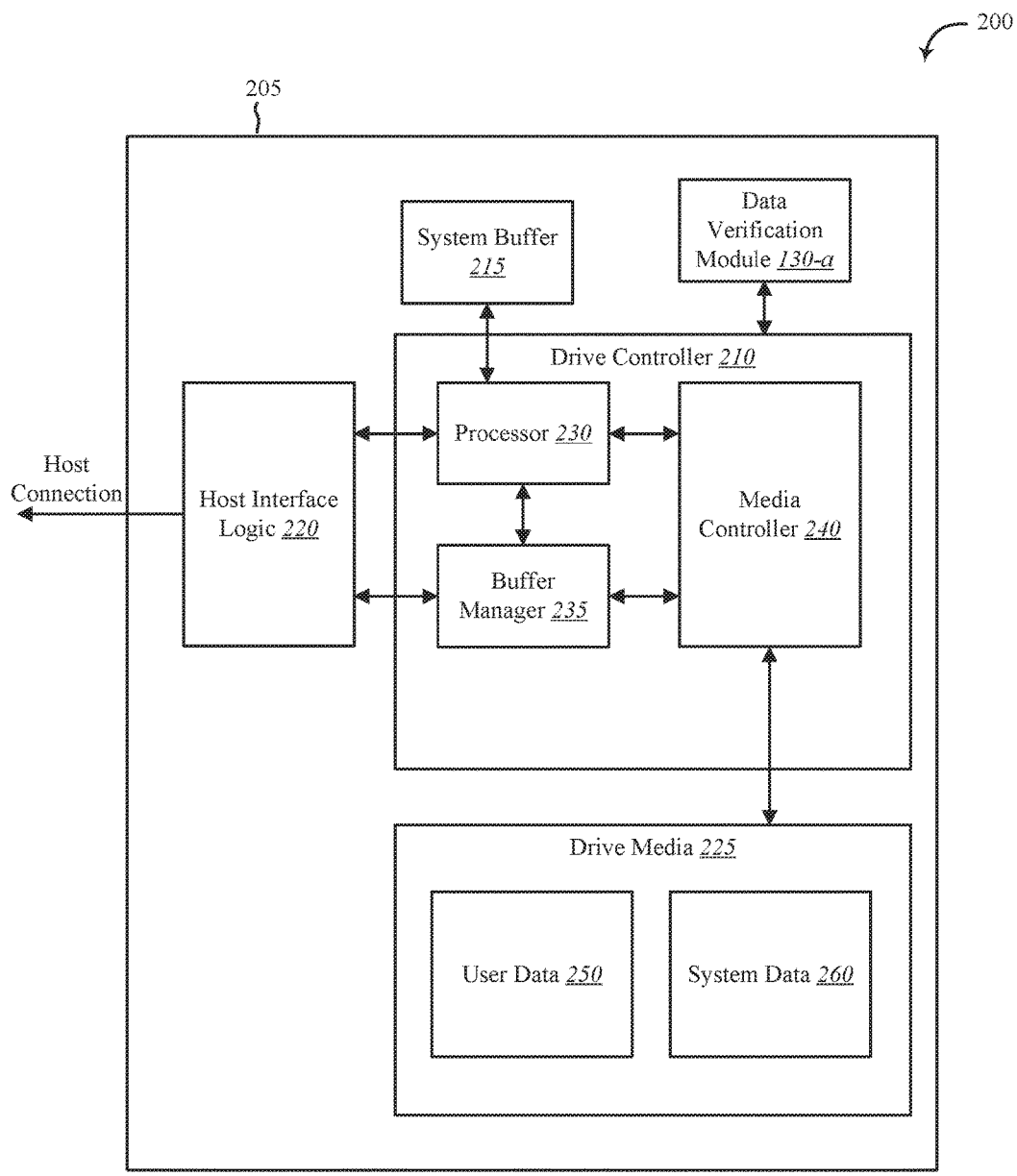
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and data verification module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215.

Although depicted outside of drive controller 210, in some embodiments, data verification module 130-a may include software, firmware, and/or hardware located within drive controller 210. For example, data verification module 130-a may include at least a portions of processor 230, buffer manager 235, and/or media controller 240. In one example, data verification module 130-a may include one or more instructions executed by processor 230, buffer manager 235, and/or media controller 240.

In some embodiments, data verification module 130-a may be configured to compute hashes for data associated with apparatus 205. As shown, drive media 225 may include user data 250 and system data 260. User data 250 may be data that apparatus 205 receives from a host of apparatus 205. In some cases, user data 250 may include metadata. The system data may include firmware, mapping tables, forward tables, firmware variables, metadata, etc. In some embodiments, data verification module 130-a may compute one or more hashes of at least a portion of user data 250 and/or at least a portion of system data 260. In some embodiments, data verification module 130-a may compute a hash of data in system buffer 215, processor 230, buffer manager 235, media controller 240, host interface logic 220, or any combination thereof. Further details of data verification module 130-a are described below.

Figure 3:
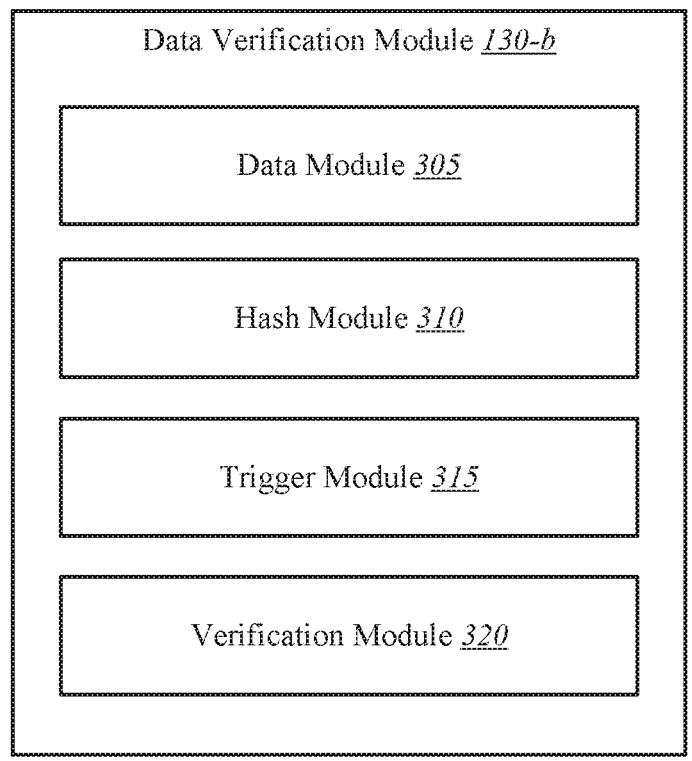
FIG. 3 shows a block diagram of one or more modules in accordance with various aspects of this disclosure.

FIG. 3 shows a block diagram of a data verification module 130-b. The data verification module 130-b may include one or more processors, memory, and/or one or more storage devices. The data verification module 130-*b* may include data module 305, hash module 310, trigger module 315, and verification module 320. The data verification module 130-*b* may be one example of data verification module 130 of FIGS. 1 and/or 2. Each of these components may be in communication with each other. In some embodiments, data verification module 130-*a* may perform one or more operations in conjunction with a storage drive and/or a controller of the storage drive.

In some embodiments, the data verification module 130-*b* may perform one or more operations in relation to a storage system. The storage system may include a storage drive, a storage server, a storage enclosure housing multiple storage drives, a cloud storage system, or any combination thereof. A host of the storage system may include an operating system and/or a computing device hosting the storage system. The computing device hosting the storage system may include a mobile computing device, a laptop, desktop, server, or any combination thereof. In some cases, the storage system may include storage system memory. The storage system may include a primary storage medium such as hard disk platters, flash memory, or any combination thereof. In some configurations, the storage system memory may be separate from the primary storage medium of the storage system. In some embodiments, at least a portion of the storage system memory may include main memory from the host of the storage system. In some cases, the storage system memory may be located entirely on the storage system.

In one embodiment, data module 305 may be configured to identify data to be authenticated. In some cases, data module 305 may be configured to identify any data stored in a particular storage system memory as data to be authenticated. Additionally, or alternatively, data module 305 may be configured to identify specific sets of data such as specific firmware, executable files, tables, user data, etc. In some embodiments, hash module 310 may be configured to compute a first hash of the data using a hash function. In some cases, the hash function may include a cryptographic hash function.

In some embodiments, trigger module 315 may be configured to detect a trigger event associated with the storage system. In some configurations, the trigger event may include the storage system entering a low power mode, the storage system exiting a low power mode, a loss of power to the storage system, the storage system recovering from a loss of power, a power cycling of the storage system, a scheduled event, lapsing of a predetermined time period, execution of a predetermined process by at least one of a host of the storage system and the storage system, an execution time of a process satisfying a predetermined process time threshold, or any combination thereof. In some embodiments, the hash module 310 may compute the first hash upon detecting the trigger event. For example, upon detecting the storage system entering a low power mode, hash module 310 may compute the first hash.

In some cases, trigger module 315 may detect the trigger event after hash module 310 computes the first hash of the data. For example, upon determining an execution time of a process associated with the storage system satisfies process time threshold. For instance, data verification module 130-*b* may configure a process time threshold for one minute. Upon trigger module 315 determining the process has executed for at least one minute since the process was initiated, hash module 310 may compute the first hash. Upon trigger module 315 determining the process has completed, hash module 310 may compute the second hash. In some cases, hash module 310 may compute another hash for each additional minute the process continues to execute. For example, after running 3 minutes and 10 seconds, hash module 310 may compute a first hash at or after the first minute, a second hash at or after the second minute, a third hash at or after the third minute, and a fourth hash once the process terminates.

In some embodiments, verification module 320 may be configured to authenticate the data in relation to the trigger module 315 detecting a trigger event. For example, upon resuming operation of the storage system after a loss of power to the storage system, for example, verification module 320 may authenticate the data based at least in part on the first hash of the data.

In some embodiments, hash module 310 may be configured to compute a second hash of the data using the hash function. In some cases, the hash module 310 may compute the second hash of the data after the trigger event. For example, a trigger event may include a loss of power to the storage system. The hash module 310 may compute the first hash before and/or at the time of the trigger event. For instance, a volatile storage system memory such as a dynamic random access memory (DRAM) of the storage system may be connected directly to a non-volatile storage system memory such as a NOR flash. Upon trigger module 315 detecting a loss of power, data module 305 may copy contents of the DRAM to the NOR flash. In conjunction with copying the data from the DRAM to the NOR flash, hash module 310 may compute a first hash of at least a portion of the copied data. In some cases, the first hash may be stored on the NOR flash. Upon recovering from the loss of power, the hash module 310 may compute a second hash of the same portion of the data copied to the NOR flash from which the hash module 310 computed the first hash. In some cases, the data module 305 may copy the contents of the NOR flash back to the DRAM upon recovering from the loss of power. In some configurations, hash module 310 may compute the second hash in conjunction with the data module 305 copying the data from the NOR flash back to the DRAM.

In some embodiments, hash module 310 may be configured to compare the first hash to the second hash. Hash module 310 may compare the first hash to the second hash to determine whether the first hash matches the second hash. In the example above of hash module 310 computing four hashes in relation to a process executing for 3 minutes 10 seconds, in one embodiment, hash module 310 may compare any two of the four hashes to determine whether the two selected hashes match.

In some embodiments, hash module 310 may be configured to compare the first hash of the data to the second hash of the data to determine whether any changes occurred to the data in relation to the trigger event. For example, data corruption due to an anomaly in hardware, firmware, and/or software may cause the data to be modified in relation to the trigger event. In some cases, a malicious entity may infect a storage system with malware. The malware may be configured to modify data on the storage system. This data may include the data identified by the data module 305 for authentication.

As one example, a storage system may include firmware. The data module 305 may identify the firmware as at least part of the data identified for authentication. The data module 305 may identify the firmware as data to be authenticated in relation to a trigger event and/or some other event relative to a storage system. The firmware currently installed and used by the storage system may be, for the purpose of this example, version A3. At some point, trigger module 315 may detect a trigger event of the storage system such as the storage system and/or a storage drive of the storage system entering into a low power state. During the low power state, the malware may alter the currently installed firmware. For instance, the malware may alter the programming of the firmware to alter one or more operations of the storage system. In some cases, the malware may revert the firmware to a previous version such as an A2 version of the firmware. Without the data verification module 130-a, the storage system may exit from the low power mode, enter into a full-function power mode and a user of the storage system may be unaware that any change to the firmware has occurred. As a result, the storage system and/or the data stored on the storage system may be comprised, which may result in loss of data on the storage system and/or at least one hardware component of the storage system.

Accordingly, hash module 310 may generate the first hash of the data before and/or in response to the trigger module 315 detecting the trigger event, generate a second hash of the data after the trigger event, and compare the first hash to the second hash after generating the second hash of the data. Upon hash module 310 determining the first hash matches the second hash, in some embodiments, data module 305 may be configured to mark the data as being authenticated. Accordingly, hash module 310 may enable the storage system to perform an operation in relation to the data.

Upon hash module 310 determining the first hash does not match the second hash, in some embodiments, data module 305 may be configured to invalidate the data. In some embodiments, hash module 310 may generate a notification indicating the data failed authentication. In some cases, the data verification module 130-a may identify the data that fails authentication and send a notification to an administrator of the storage system. In some cases, the notification sent to the administrator may indicate data has failed authentication and identify the data that has failed.

In one embodiment, data module 305 may be configured to store the first hash in a storage system memory of the storage system. In some embodiments, data module 305 may be configured to encrypt the first hash. In some embodiments, data module 305 may be configured to store the encrypted first hash in a storage system memory. For example, a storage drive of the storage system may include one or more non-volatile memories such as NOR flash and/or NAND flash chips. Accordingly, data module 305 may store the first hash and/or encrypted first hash in a non-volatile memory of a storage drive.

In some embodiments, hash module 310 may be configured to compute a periodic hash for specified data. In some cases, the periodic hash may be computed repetitively in relation to a predetermined interval. The specified data may include firmware for the storage system and/or a storage drive, one or more firmware variable sets, any number of tables such as forward tables, mapping tables, etc., user data, specific files in a storage system memory, system data, metadata, or any combination thereof. In some cases, the specified data may include at least a portion of the contents stored in a storage system memory. In some configurations, the specified data may include the entire contents of a storage system memory.

Figure 4:
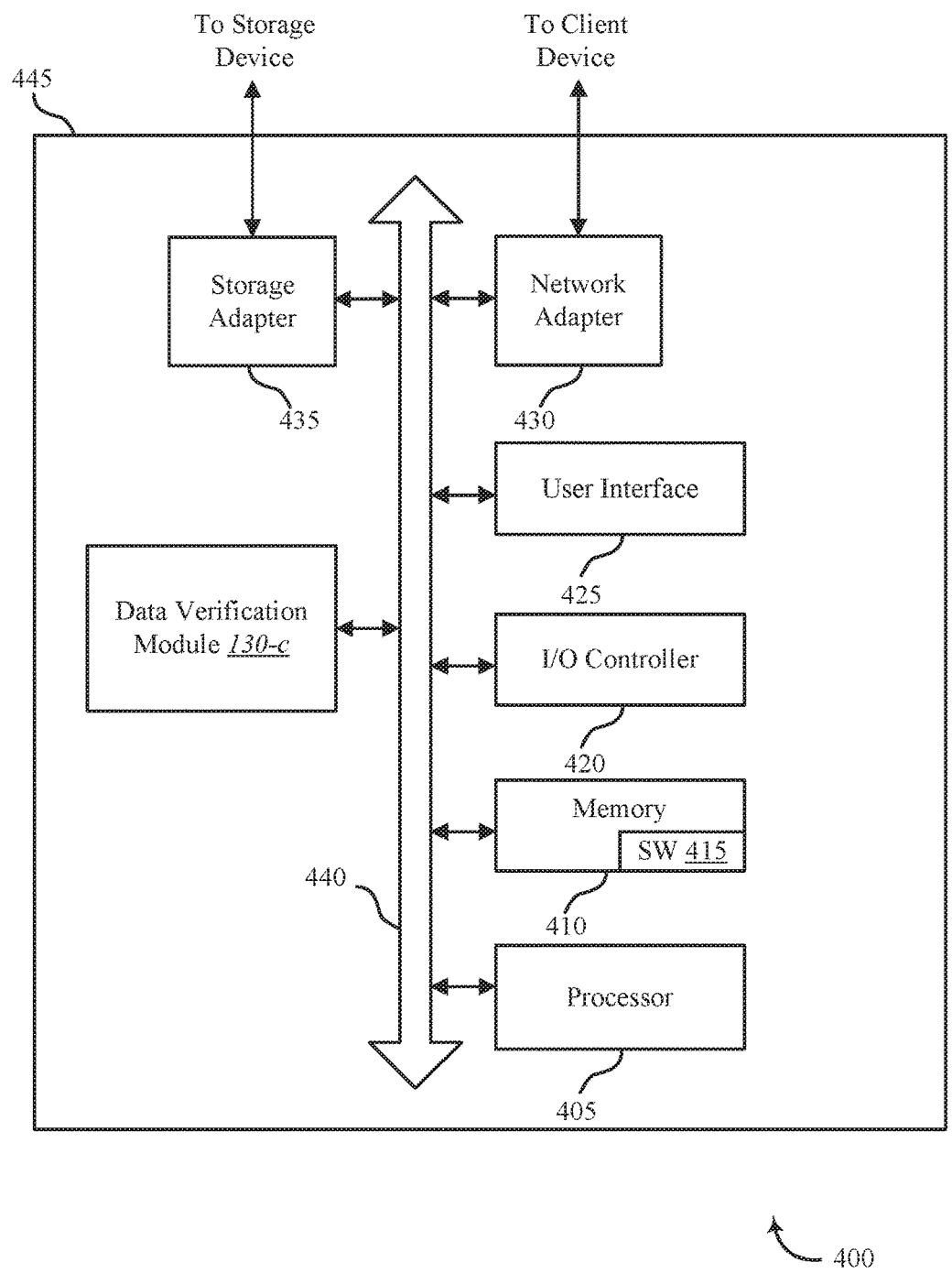
FIG. 4 shows a diagram of a system in accordance with various aspects of this disclosure.

FIG. 4 shows a system 400 for hash authenticated data, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a data verification module 130-c, which may perform the functions described above for the data verification module 130 of FIGS. 1, 2, and/or 3. In some embodiments, data verification module 130-c may compute one or more hashes of at least a portion of the data in memory 410.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

In some embodiments, memory 410 may be an example of one or more storage system memories. The memory 410 may include random access memory (RAM), read only memory (ROM), flash RAM, NOR memory, NAND memory, other types of non-volatile and/or volatile memory, or any combination thereof. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), or any combination thereof.

In some embodiments, the memory 410 may contain, among other things, the Basic Input-Output system (BIOS) which may control basic hardware and/or software operation such as the interaction with peripheral components or devices. For example, at least a portion of the data verification module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to one or may be included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a data communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
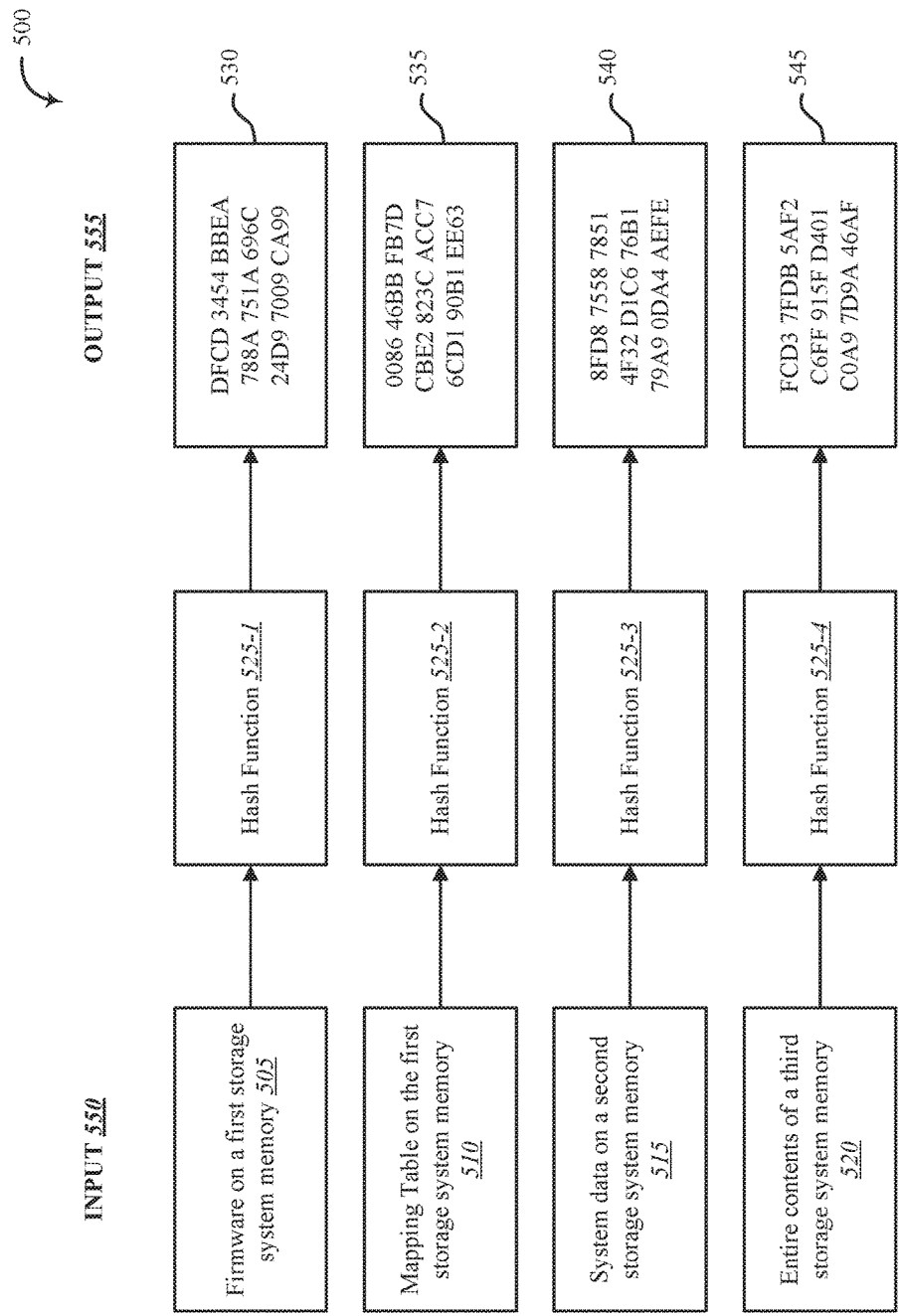
FIG. 5 shows one embodiment of an environment in accordance with various aspects of this disclosure.

FIG. 5 shows an environment 500 for hash authenticated data, in accordance with various examples. At least one aspect of environment 500 may be implemented in conjunction with device 105 of FIG. 1, apparatus 205 of FIG. 2, and/or data verification module 130 depicted in FIGS. 1, 2, 3, and/or 4. In some embodiments, environment 500 may depict one or more aspects of a storage system and/or a storage drive of a storage system.

As depicted, environment 500 may include one or more inputs 550, one or more hash functions 525, and one or more outputs 555. The one or more inputs 550 may include firmware on a first storage system memory 505, a mapping table on the first storage system memory 510, system data on a second storage system memory 515, and the entire contents of a third storage system memory. In some embodiments, outputs 555 may include first hash 530, second hash 535, third hash 540, and/or fourth hash 545.

In some embodiments, the illustrated hash functions 525 may operate in conjunction with a hash processor specific to each hash function. For example, hash function 525-1 may operate in conjunction with a first hash processor, hash function 525-2 may operate in conjunction with a second hash processor different from the first hash processor, and so on. In some cases, at least two of the illustrated hash functions 525 may operate in conjunction with the same hash processor. In some embodiments, hash functions 525 may include at least one cryptographic hash function. In some cases, at least two of the illustrated hash functions 525 may use the same hash function. In some configurations, hash functions 525 may each use a different, unique hash function. Thus, in some cases, hash function 525-1 may use a first hash function to compute the hash of firmware on the first storage memory 505, hash function 525-2 may use a second hash function to compute the hash of mapping table on the first storage memory 510, and so forth.

As illustrated, one or more inputs 550 may be inputted into the one or more hash functions 525. As a result, the one or more hash functions 525 may output the one or more outputs 555. For example, as shown hash function 525-1 may receive firmware on a first storage system memory 505 as input. Hash function 525-1 may then output first hash 530 as a hash of the firmware on a first storage system memory 505. As described above, hash function 525-1 may include a cryptographic hash function. Thus, hash function 525-1 may output a cryptographic hash. Accordingly, as shown, first hash 530 may include the cryptographic hash DFCD 3454 BBEA 788A 751A 696C 24D9 7009 CA99 as the output from hash function 525-1. Similarly, hash functions 525-2, 525-3, and/or 525-4 may output cryptographic hashes of their respective inputs.

Figure 6:
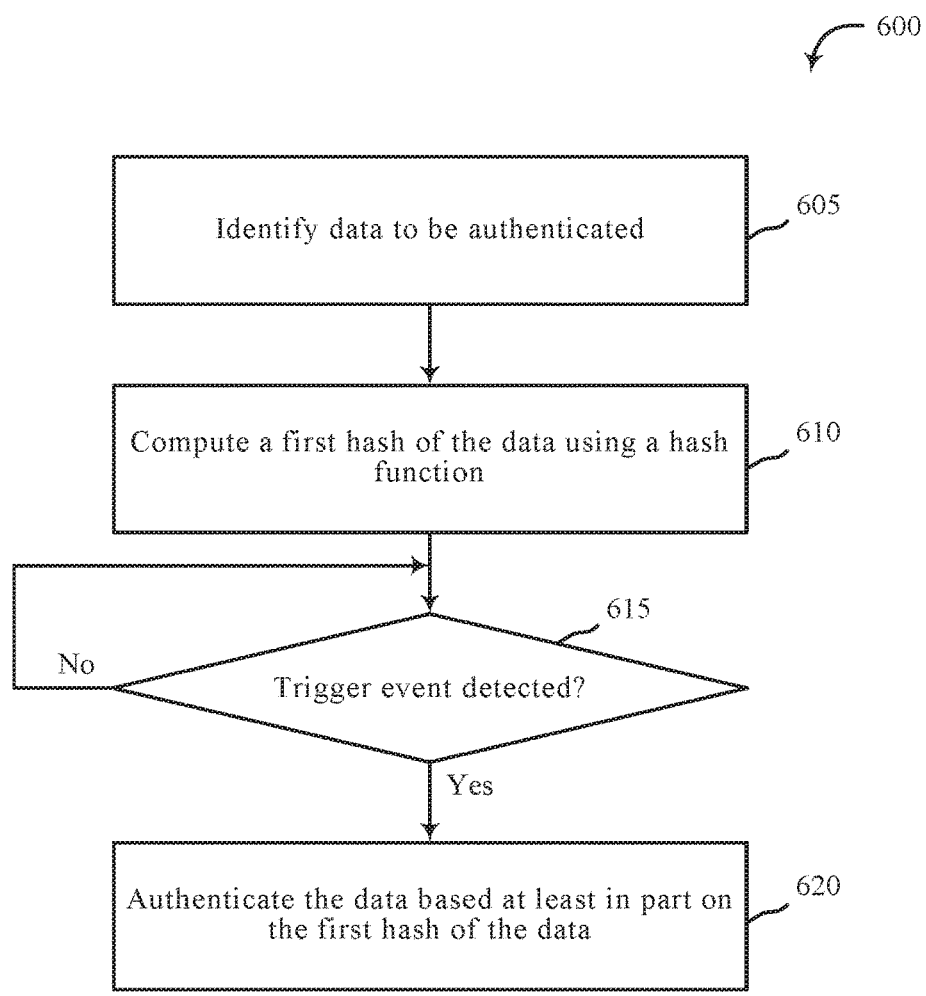
FIG. 6 is a flow chart illustrating an example of a method in accordance with various aspects of this disclosure.

FIG. 6 is a flow chart illustrating an example of a method 600 for hash authenticated data, in accordance with various aspects of the present disclosure. One or more aspects of the method 600 may be implemented in conjunction with device 105 of FIG. 1, apparatus 205 of FIG. 2, and/or data verification module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include identifying data to be authenticated. At block 610, method 600 may include computing a first hash of the data using a hash function. At block 615, method 600 may include determining whether a trigger event is detected. In some cases, the method 600 may compute the first hash upon detecting a trigger event. In some embodiments, the method 600 may compute the first hash before detecting the trigger, then compute a subsequent hash upon detecting the trigger.

Upon determining a trigger event is not detected, method 600 may continue monitoring for a trigger event. In some cases, method 600 may compute another hash upon determining the data has been modified since computing the first hash. For example, the data may include firmware that is updated based on a secure updating process. Upon updating the firmware, method 600 may compute another hash of the firmware and continue monitoring for trigger events. At block 620, after detecting a trigger event, method 600 may include authenticating the data based at least in part on the first hash of the data. In some cases, authenticating the data may include comparing the first hash of the data to another hash of the data.

The operation(s) at block 605-620 may be performed using the data verification module 130 described with reference to FIGS. 1-4 and/or another module. Thus, the method 600 may provide for hash authenticated data relating to hash authenticated data. It should be noted that the method 600 is just one implementation and that the operations of the method 600 may be rearranged, omitted, and/or otherwise modified such that other implementations are possible and contemplated.

Figure 7:
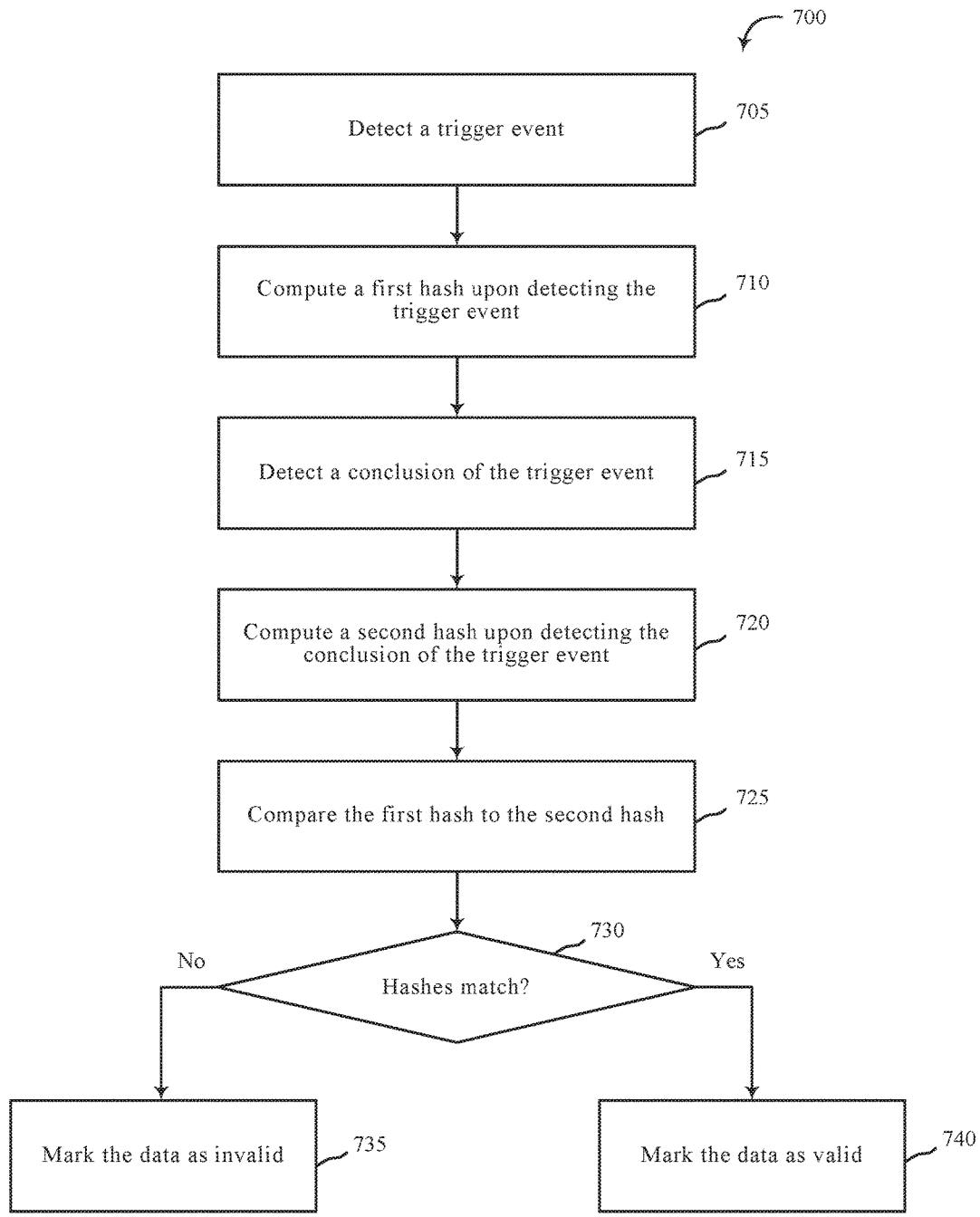
FIG. 7 is a flow chart illustrating an example of a method in accordance with various aspects of this disclosure.

FIG. 7 is a flow chart illustrating an example of a method 700 for hash authenticated data, in accordance with various aspects of the present disclosure. One or more aspects of the method 700 may be implemented in conjunction with device 105 of FIG. 1, apparatus 205 of FIG. 2, and/or data verification module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include detecting a trigger event in relation to a storage system. At block 710, method 700 may include computing a first hash upon detecting the trigger event. At block 715, method 700 may include detecting a conclusion of the trigger event. At block 720, method 700 may include computing a second hash upon detecting the conclusion of the trigger event. At block 725, method 700 may include comparing the first hash to the second hash.

At block 730, the method 700 may determine whether the first and second hashes match. Upon determining the first and second hashes do not match, the method 700 may include marking the data as invalid as indicated at block 735. In some cases, the method 700 may generate a notification identifying the data and indicating the data is invalid and send the notification to an administrator of the storage system. Upon determining the first and second hashes match, the method 700 may include marking the data as valid as indicated at block 740. In some cases, the method 700 may enable one or more operations to be performed in relation to the data based on the verified authenticity of the data.

The operations at blocks 705-740 may be performed using the data verification module 130 described with reference to FIGS. 1-4 and/or another module. Thus, the method 700 may provide for hash authenticated data relating to hash authenticated data. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
    a storage drive having a storage drive memory and a separate primary storage medium; and
    a hardware controller of the storage drive to:
        identify data to be authenticated, the data including user data;
        compute a first hash of the data using a hash function;
        write the user data to the storage drive;
        detect a trigger event associated with the storage drive, the trigger event comprising the storage drive recovering from a loss of power;
        compute, after the trigger event, a second hash of the data using the hash function;
        compare the first hash to the second hash;
        upon determining the first hash matches the second hash, mark the data as being authenticated and enable the storage drive to perform an operation in relation to the data; and
        compute a periodic hash for at least one of firmware of the storage drive, a mapping table of the storage drive, and at least a portion of content stored in the storage drive memory, the periodic hash being computed repetitively at a predetermined interval.

2. The storage system of claim 1, comprising the controller to:
    upon determining the first hash does not match the second hash, invalidate the data and generate a notification indicating the data failed authentication.

3. The storage system of claim 1, comprising the controller to:
    encrypt the first hash; and
    store the encrypted first hash in a storage drive memory.

4. The storage system of claim 1, the hash function comprising a cryptographic hash function.

5. An apparatus comprising:
    a primary storage medium;
    apparatus memory separate from the primary storage medium;
    a hardware controller of the apparatus to:
        identify data to be authenticated, the data including user data;
        compute a first hash of the data using a hash function;
        write the user data to the apparatus memory;
        detect a trigger event associated with the apparatus, the trigger event comprising the storage drive recovering from a loss of power;
        compute, after the trigger event, a second hash of the data using the hash function;
        compare the first hash to the second hash;

upon determining the first hash matches the second hash, mark the data as being authenticated and enable the storage drive to perform an operation in relation to the data; and compute a periodic hash for at least one of firmware of the apparatus, a mapping table of the apparatus, and at least a portion of content stored in the apparatus memory, the periodic hash being computed repetitively at a predetermined interval.

6. The apparatus of claim 5, comprising the controller to:
upon determining the first hash does not match the second hash, invalidate the data and generate a notification indicating the data failed authentication.

7. The apparatus of claim 5, comprising the controller to:
encrypt the first hash; and
store the encrypted first hash in an apparatus memory.

8. A method comprising:
identifying data of a storage drive to be authenticated, the data including user data, the storage drive having a storage drive memory and a separate primary storage medium;
generating a first hash of the data using a hash function;
writing the user data to the storage drive;
detecting a trigger event associated with the storage drive, the trigger event comprising the storage drive recovering from a loss of power;
computing, after the trigger event, a second hash of the data using the hash function;
comparing the first hash to the second hash;
upon determining the first hash matches the second hash, marking the data as being authenticated and enabling the storage drive to perform an operation in relation to the data; and
compute a periodic hash for at least one of firmware of the storage drive, a mapping table of the storage drive, and at least a portion of content stored in the storage drive memory, the periodic hash being computed repetitively at a predetermined interval.

9. The method of claim 8, comprising:
upon determining the first hash does not match the second hash, invalidating the data and generating a notification indicating the data failed authentication.

* * * * *